United States Patent
Dietz et al.

(10) Patent No.: US 9,959,281 B2
(45) Date of Patent: *May 1, 2018

(54) CONCURRENT FILE AND OBJECT PROTOCOL ACCESS USING SPACE-EFFICIENT CLONING

(71) Applicant: International Business Machines Corporation, Armonk, NY (US)

(72) Inventors: Mathias Dietz, Oberhausen (DE); Dean Hildebrand, Bellingham, WA (US); Simon Lorenz, Geisenheim (DE); Brian Nelson, Austin, TX (US); William W. Owen, Tucson, AZ (US); Rainer Wolafka, Langenhain (DE)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/224,182

(22) Filed: Jul. 29, 2016

(65) Prior Publication Data
US 2017/0201581 A1    Jul. 13, 2017

Related U.S. Application Data

(63) Continuation of application No. 14/992,983, filed on Jan. 11, 2016, now Pat. No. 9,413,826.

(51) Int. Cl.
*G06F 17/30* (2006.01)

(52) U.S. Cl.
CPC .. *G06F 17/30117* (2013.01); *G06F 17/30174* (2013.01); *G06F 17/30197* (2013.01); *G06F 17/30215* (2013.01); *G06F 17/30238* (2013.01); *G06F 17/30345* (2013.01); *G06F 17/30607* (2013.01)

(58) Field of Classification Search
USPC .................................................. 707/695, 827
See application file for complete search history.

(56) References Cited

U.S. PATENT DOCUMENTS

| 5,761,678 | A | 6/1998 | Bendert et al. |
| 7,337,198 | B1 | 2/2008 | Haslam et al. |

(Continued)

OTHER PUBLICATIONS

List of IBM Patents or Patent Applications Treated As Related.
(Continued)

*Primary Examiner* — Cam-Linh Nguyen
(74) *Attorney, Agent, or Firm* — Zilka-Kotab, P.C.

(57) ABSTRACT

A computer-implemented method is provided in one general embodiment for concurrent file and object protocol access. The method includes receiving a notification that indicates storage of an object by an object-based client, and creating a clone of the object. Also, the method includes providing a file-based client access to the clone of the object. Further, the method includes, after the file-based client has finished modifying the clone of the object, replacing the object with an updated object based on the modified clone of the object. The file-based client is provided access to the modified clone of the updated object. After the file-based client has finished modifying the modified clone of the updated object, the updated object is replaced with an additional object based on the modification to the modified clone of the updated object.

20 Claims, 12 Drawing Sheets

(56) References Cited

U.S. PATENT DOCUMENTS

| | | |
|---|---|---|
| 8,180,813 B1 | 5/2012 | Goodson et al. |
| 8,423,733 B1 | 4/2013 | Ozdemir |
| 8,620,865 B2 | 12/2013 | Slik |
| 8,812,450 B1 | 8/2014 | Kesavan et al. |
| 8,849,759 B2 | 9/2014 | Bestler et al. |
| 9,413,826 B1 | 8/2016 | Dietz et al. |
| 2006/0288332 A1* | 12/2006 | Sagar .................. G06F 9/526 717/124 |
| 2007/0033594 A1 | 2/2007 | Allen et al. |
| 2008/0077634 A1* | 3/2008 | Quakenbush ..... G06F 17/30088 |
| 2009/0327219 A1* | 12/2009 | Finn ................. G06F 17/30067 |
| 2010/0094847 A1 | 4/2010 | Malan et al. |
| 2011/0137966 A1 | 6/2011 | Srinivasan et al. |
| 2012/0130949 A1 | 5/2012 | Picken et al. |
| 2012/0278553 A1 | 11/2012 | Mudhiganti et al. |
| 2013/0054927 A1 | 2/2013 | Raj et al. |
| 2013/0212579 A1 | 8/2013 | Ben-Shaul et al. |
| 2014/0025713 A1 | 1/2014 | Avati et al. |
| 2014/0337686 A1 | 11/2014 | Baptist et al. |
| 2016/0004720 A1 | 1/2016 | Tabaaloute et al. |
| 2016/0292041 A1* | 10/2016 | Bender ............... G06F 11/1451 |
| 2016/0335278 A1* | 11/2016 | Tabaaloute ........ G06F 17/30212 |
| 2017/0185929 A1* | 6/2017 | Theriault ......... G06Q 10/06312 |

OTHER PUBLICATIONS

Mell et al., "The NIST Definition of Cloud Computing," NIST Special Publication 800-145, Sep. 2011, 7 pages.

Mell et al., "The NIST Definition of Cloud Computing," Information Page, Version 15, Oct. 7, 2009, 2 pages.

NIST, "NIST Cloud Computing Program," Information Technology Laboratory webpage, last updated Nov. 13, 2013, 3 pages.

Dietz et al., U.S. Appl. No. 14/992,983, filed Jan. 11, 2016.

Notice of Allowance from U.S. Appl. No. 14/992,983, dated May 2, 2016.

* cited by examiner

CONCURRENT FILE AND OBJECT PROTOCOL ACCESS USING SPACE-EFFICIENT CLONING

BACKGROUND

The present invention relates to file access, and more particularly, this invention relates to concurrent file protocol and object protocol access in cloud storage systems and networks.

A large amount of data currently exists on servers that are accessed by a variety of clients over networks via Network-Attached Storage (NAS) protocols, such as Network File System (NFS) and Server Message Block (SMB).

It is becoming increasingly common to access data via object interfaces, such as the OpenStack Object Store project, also referred to as OpenStack Swift. Data access to object stores is typically web-based, such as via mobile devices or web browsers. Object-based clients expect the data in a certain file system layout.

In some environments, it may be necessary for the same data to be accessed via both object-based and NAS-based protocols. However, NAS-based protocols and object-based access protocols may contradict in a variety of ways.

For example, objects in an object store are immutable, such that only the whole object can be updated, and parts of an object cannot be updated. Additionally, objects cannot be directly accessed, but need to be downloaded from the object store by a client, and then can be updated by uploading a new version of the object to the object store. In contrast, files accessed via NAS protocols may be directly accessed by clients via an export or share. Moreover, files accessed via NAS protocols can be partially modified (i.e., modifications to byte ranges within files).

SUMMARY

In one general embodiment, a computer program product is provided for concurrent file and object protocol access. The computer program product comprises a computer readable storage medium having computer readable program code embodied therewith. The computer readable program code is configured to receive a notification that indicates storage of an object by an object-based client. Also, the computer readable program code is configured to create a clone of the object, and to provide a file-based client access to the clone of the object. Additionally, the computer readable program code is configured to return, in response to one or more read requests for the object received from one or more object-based clients while the file-based client modifies the clone of the object, the object to the one or more object-based clients. Moreover, the computer readable program code is configured to, after the file-based client has finished modifying the clone of the object, replace the object with an updated object based on the modified clone of the object.

In another general embodiment, a computer-implemented method is provided for concurrent file and object protocol access. The method includes receiving a notification that indicates storage of an object by an object-based client, and creating a clone of the object. Also, the method includes providing a file-based client access to the clone of the object. Further, the method includes, after the file-based client has finished modifying the clone of the object, replacing the object with an updated object based on the modified clone of the object. The file-based client is provided access to the modified clone of the updated object. After the file-based client has finished modifying the modified clone of the updated object, the updated object is replaced with an additional object based on the modification to the modified clone of the updated object.

In another general embodiment, a computer program product is provided for concurrent file and object protocol access. The computer program product comprises a computer readable storage medium having computer readable program code embodied therewith. The computer readable program code is configured to receive a notification that indicates storage of an object by an object-based client. Also, the computer readable program code is configured to create a clone of the object, and to provide a file-based client access to the clone of the object. Additionally, the computer readable program code is configured to, after the file-based client has finished modifying the clone of the object, replace the object with an updated object based on the modified clone of the object. Additionally, the computer readable program code is configured to provide the file-based client access to the modified clone of the updated object, and after the file-based client has finished modifying the modified clone of the updated object, replace the updated object with an additional object based on the modification to the modified clone of the updated object Other aspects and embodiments of the present invention will become apparent from the following detailed description, which, when taken in conjunction with the drawings, illustrate by way of example the principles of the invention.

DETAILED DESCRIPTION

Figure 1:
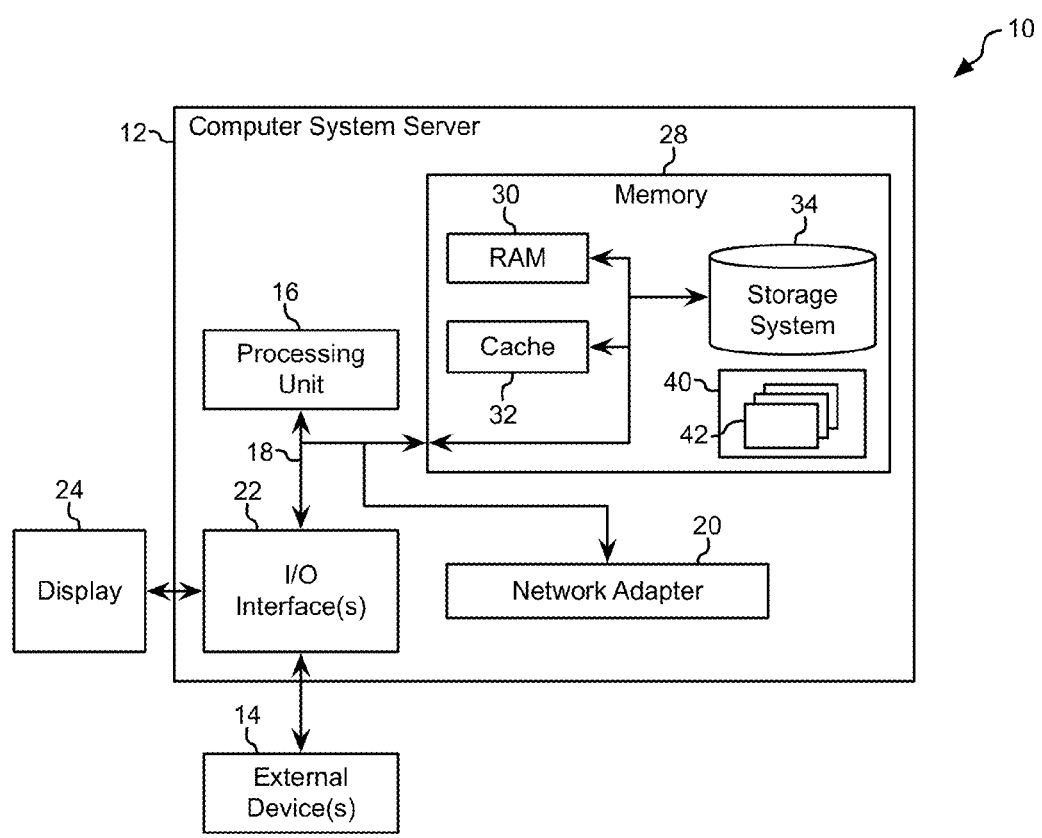
FIG. 1 depicts a cloud computing node, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of systems, methods, and computer program products for providing concurrent file and object protocol access using-space efficient cloning.

In one general embodiment, a computer program product is provided for concurrent file and object protocol access. The computer program product comprises a computer readable storage medium having computer readable program code embodied therewith. The computer readable program code is configured to receive a notification that indicates storage of an object by an object-based client. Also, the computer readable program code is configured to create a clone of the object, and to provide a file-based client access to the clone of the object. Additionally, the computer readable program code is configured to return, in response to one or more read requests for the object received from one or more object-based clients while the file-based client modifies the clone of the object, the object to the one or more object-based clients. Moreover, the computer readable program code is configured to, after the file-based client has finished modifying the clone of the object, replace the object with an updated object based on the modified clone of the object.

In another general embodiment, a computer-implemented method is provided for concurrent file and object protocol access. The method includes receiving a notification that indicates storage of an object by an object-based client, and creating a clone of the object. Also, the method includes providing a file-based client access to the clone of the object. Further, the method includes returning, in response to one or more read requests for the object received from one or more object-based clients while the file-based client modifies the clone of the object, the object to the one or more object-based clients. Moreover, the method includes, after the file-based client has finished modifying the clone of the object, replacing the object with an updated object based on the modified clone of the object.

In another general embodiment, a system is provided. The system includes a processor and logic integrated with and/or executable by the processor. The logic is configured to receive a notification that indicates storage of an object by an object-based client, and to create a clone of the object. The logic is also configured to provide a file-based client access to the clone of the object. Still yet, the logic is configured to return, in response to one or more read requests for the object received from one or more object-based clients while the file-based client modifies the clone of the object, the object to the one or more object-based clients. Moreover, the logic is configured to, after the file-based client has finished modifying the clone of the object, replace the object with an updated object based on the modified clone of the object.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
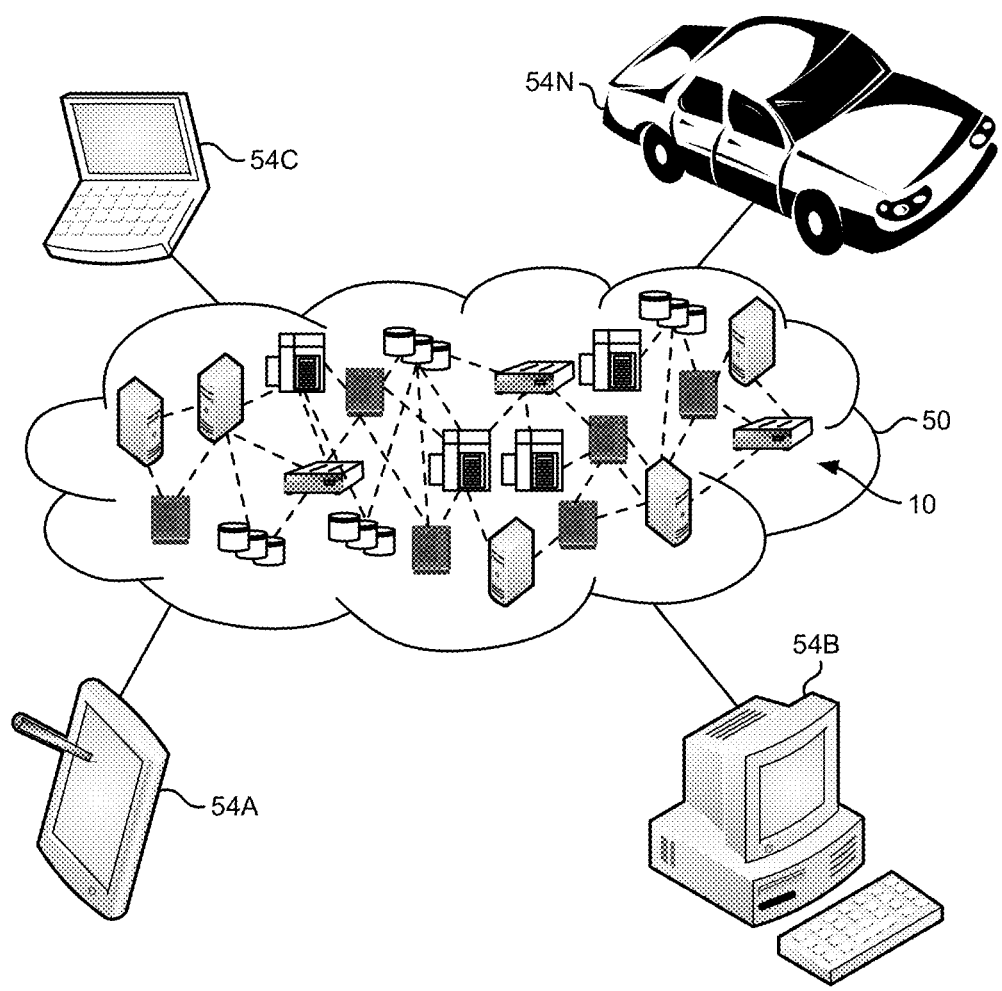
FIG. 2 depicts a cloud computing environment, according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
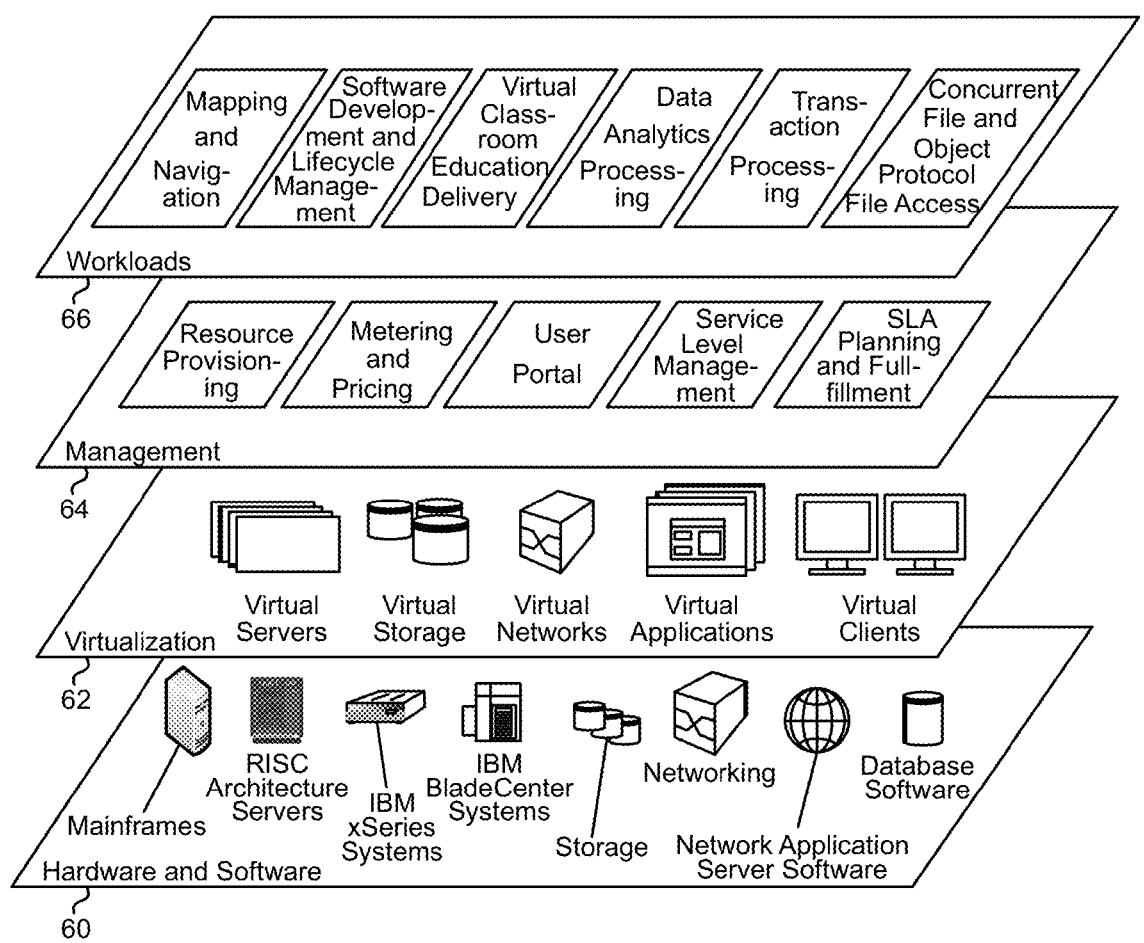
FIG. 3 depicts abstraction model layers, according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; concurrent file and object protocol access using-space efficient cloning; etc.

Figure 4:
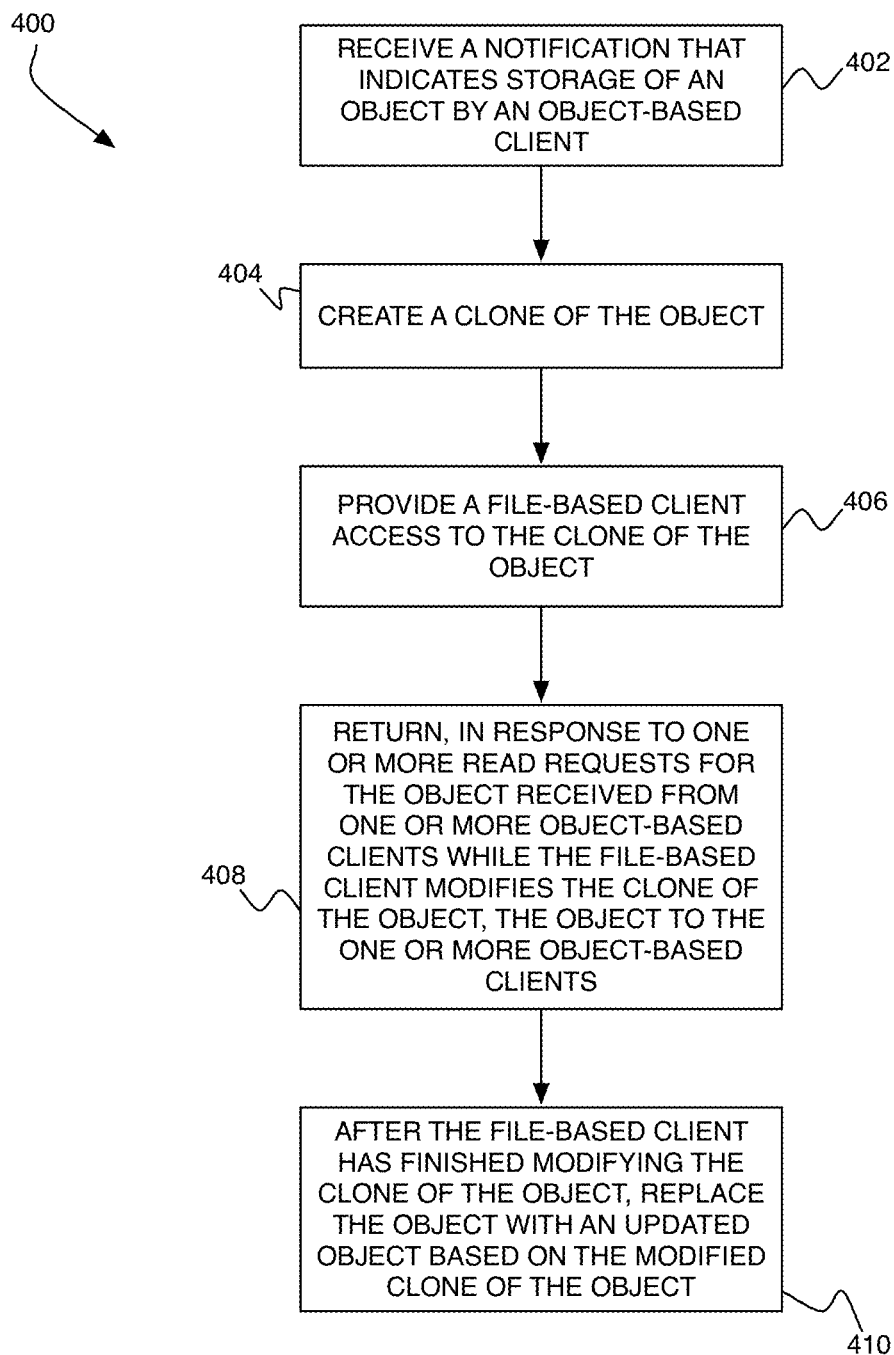
FIG. 4 depicts a method for concurrent file and object protocol access using space-efficient cloning, according to one embodiment.

Now referring to FIG. 4, a flowchart of a method 400 for concurrent file and object protocol access using space-efficient cloning is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a notification is received that indicates storage of an object by an object-based client. As used herein, the object comprises a discrete unit of storage in a storage pool. The object-based client may include any device that accesses resources in the storage pool through an object server. In one embodiment, the object-based client may include a cloud computing node, user device, or computer, as described in the context of FIG. 2. Moreover, the object-based client may store objects to, retrieve objects from, and/or delete objects from an object storage device.

In various embodiments, an object may be stored as a binary file with metadata stored in extended attributes for the binary file. Further, each object may be stored with one or more other objects within a container storage location, and each container storage location may be stored with one or more other container storage locations within an account storage location. Each account storage location may contain information about itself, and the container storage locations within the account storage location. Similarly, each container storage location may contain information about itself, and the objects stored within the container storage location. As described herein, each container storage location may be referred to as a "container," and each account storage location may be referred to herein as an "account."

Accordingly, the storage of the object may include any operation includes the saving of at least one instance of the object in an object storage system. Still yet, the notification may comprise any electronic message that informs of the storage of the object by the object-based client.

Additionally, a clone of the object is created at operation 404. As used herein, the clone of the object includes a representation of the object that tracks changed blocks of the object. In other words, the clone of the object includes a representation of the blocks of the object that have changed relative to when the object was stored by the object-based client at operation 402. In this manner, changes to the object may be tracked without replicating the entirety of the object. Accordingly, utilizing a clone of the object may ensure that a space efficient copy of the data of the object is created before any file-based client attempts to change the data via a NAS protocol. In this way, creating clones of the objects for use by the file-based clients ensures optimal utilization of system resources, such as raw storage, as well as metadata resources, such as file system inodes.

In one embodiment, the clone of the object is created in response to the notification indicating the storage of the object by the object-based client. In another embodiment, the clone of the object is created in response to a request to access the object. For example, the clone may be created when a file-based client attempts to access the object. The access attempt may include, for example, a request to read or modify data of the object.

Moreover, at operation 406, a file-based client is provided access to the clone of the object. As used herein, the file-based client includes any device that accesses data of the object utilizing specified paths through a hierarchical structure of a file system. As an option, the file-based client may access the clone of the object utilizing one or more file-based network attached storage (NAS) protocols, such as, for example, NFS, SMB, etc. In one embodiment, the file-based client may include computing node, user device, or computer, described as described in the context of FIG. 2. The access provided to the file-based client may include any operation that retrieves or modifies a content of the clone of the object.

In some environments, it may be necessary for the same data to be accessed via both object-based and NAS-based protocols. However, NAS-based protocols and object-based access protocols may contradict in a variety of ways. In particular, access to files via a NAS protocol is typically implemented in the form of opening a file by specifying a mode such as read, write, etc., then making changes to the entire file or part of the file, and closing the file. In addition, file-based storage (e.g., a file system) is organized in a hierarchical fashion, which may utilize POSIX semantics to traverse a file system hierarchy until a file is found.

In contrast, object-based storage is addressed via "lookup" semantics (e.g., find a specific object). Moreover, objects in an object store are immutable, such that only the whole object can be updated, and parts of an object cannot be updated. Additionally, objects cannot be directly accessed and modified, but instead need to be downloaded from the object store by a client, and then can be updated and again uploaded to the object store.

Accordingly, utilizing the clone of the object, the file-based client may modify the data of the object without violating the characteristics inherent to object-based storage. In other words, the object immutability requirement for object-based storage is maintained by ensuring that any file-based client opening the object for writing (e.g., open with write flags) will work on a clone of the object data and keep the original data of the object unchanged. Still yet, in this way, the same data may be concurrently accessed utilizing both NAS protocols and object interfaces. In other words, GET requests from object-based clients will continue to return the immutable object data (i.e., as it was originally stored), while file-based clients are able to work with the data, and even make modifications, over NAS protocols. Moreover, the access of the file-based clients is direct, without requiring a gateway or translation layer, while ensuring that correct access semantics are utilized at both the object-based and file-based interfaces.

Still yet, in response to one or more read requests for the object received from one or more object-based clients while the file-based client modifies the clone of the object, the object is returned, at operation 408, to the one or more object-based clients. As used herein, a read request includes any instruction to provide a content or data of the object. In one embodiment, the request may include an HTTP GET request. For example, the request may include a GET request for the object that has been made accessible via an object storage API. In this manner, object-based clients may obtain the data of an object concurrent with the modification of the content of the object by a file-based client.

Also, after the file-based client has finished modifying the clone of the object, the object is replaced, at operation 410, with an updated object based on the modified clone of the object. The updated object comprises a new object added to the storage pool that includes any changes made to the object, and tracked in the clone of the object, as applied to the object. In other words, the updated object comprises the object upon which the modified clone is based, in addition to any changes or modifications made to the clone by the file-based client.

In one embodiment, once the file-based client is finished modifying the clone of the object to create a second version of the clone (i.e., a second clone), the first version of the clone of the object is exchanged with the second version of the clone that was created. As an option, the closing of the clone of the object by the file-based client may signal that the file-based client has finished modifying the clone. In this manner, the second version of the clone may become the current version of the object, and a storage pool containing the object may be updated to reflect this change. Storing more than one version of a clone may enable the efficient use of object versions, where only changed data is stored between later versions of an object and the original object.

In this way, any changes made by the file-based client and tracked in the clone of the object may be merged with the object to create the updated object. In one embodiment, the updated object replaces the object such that the updated object is returned to one or more object-based clients in response read requests for the object received from the one or more object-based clients after the file-based client has finished modifying the clone of the object. In other words, after the object has been replaced with an updated object based on the modified clone of the object, any object request may return the changes introduced in the modified clone. In this manner, an object-based client will always get a consistent version of any object (i.e., file) and not an intermediate state of the object that would violate the object specification.

In one embodiment, a second clone of the updated object is created. In other words, a second clone may be created that tracks changed blocks of the updated object. In this manner, changes to the updated object may be tracked without replicating the entirety of the updated object.

In one embodiment, the clone of the object is removed in response to creating the second clone of the updated object. Because the second clone it utilized to track any modifications made by file-based clients to the updated object, the clone of the object is no longer needed to track changes made to the object upon which the updated object is based.

In other words, after creation of the second clone and the updated object, the original object and the clone of the object may no longer be accessed. Accordingly, as an option, the object may be deleted after creating the second clone of the updated object.

In some embodiments, the creation of new clones and objects may occur recursively such that new objects, and clones of the new objects, are continuously being created. A file-based client may access the modified clone of the object, and the file-based client may further modify the modified clone of the object. After the file-based client has finished modifying the modified clone of the object, an additional clone of the object may be generated based on the modification of the modified clone by the file-based client. Also, after the file-based client has finished modifying the modified clone of the object, the updated object may be replaced with an additional object based on the additional clone of the object. In this way, file-based clients may continually update the data of an object-store while the underlying objects of the object store remain uninterruptedly available to object-based clients.

In one embodiment, the updated object may be returned to the one or more object-based clients. The updated object may be returned in response to one or more read requests for the object received from one or more object-based clients. The read requests may be received while the file-based client modifies the modified clone of the object to generate the additional clone.

In some embodiments, each of the clone, the modified clone, and the additional clone may be separately and simultaneously stored. In other words, two or more different clones for two or more versions of a given object may be concurrently stored in a storage location. The two or more different clones for the two or more versions of the object may be utilized to support the versioning of the object for file-based clients.

In another embodiment, one or more of the clone, the modified clone, and the additional clone may be de-cloned when a predetermined number of clones are associated with the object. For example, a predetermined threshold may dictate that the oldest clone associated with an object is removed whenever three or more different clones are associated with a given object. In such an example, the two most recent clones may be kept, but not the oldest clone, thereby limiting the ability of a file-based client to access the oldest version of the object.

As an option, the concurrent file and object protocol access manager may implemented in an environment that allows object versioning. If an object container is set to versioning, then former object data may be stored into a versioned container before the changes of a clone are merged with an object to create the updated object.

In some embodiments, an object-based client may attempt to update an object. For example, the object-based client may issue a PUT request.

As one option, when the object-based client attempts to update the object, the object may be updated as usual, and the updated object may be returned in response to any subsequent GET request for the object. However, if a file-based client subsequently finishes modifying a previously created clone of the object, then the process may continue as described above. In other words, the object data stored by the object-based client's PUT request may be overwritten by the file-based client's saved modification of the previously-created clone of the object. Consequently, changes implemented in the clone of the object may be merged with the object. Subsequent GET requests for the object may return a version of the object including the changes implemented by the file-based client in the clone of the object. In this way, the last PUT or clone copy may become the current version of the object.

As another option, when the object-based client attempts to update the object (e.g., with a PUT request), a concurrent file and object protocol access manager may determine whether a clone of the object exists, whether the clone is being accessed, whether the clone is being modified, etc. If a clone of the object exists, then the update may be denied. As an option, an HTTP error may be returned to the client. Once access to the clone has completed, the object may be updated to reflect any modifications tracked in the clone. In other words, a current version of the object may be updated to reflect changes made by a file-based client. Further, the clone may be removed. Any subsequent attempted object retrieval by the object-based client may then return the updated object in its consistent state.

In some embodiments, the use of clones to track the modifications made to objects may allow an underlying file system of a storage pool to perform erasure coding of data, and increase storage efficiency. As a result, objects and files may be accessed by the respective clients without requiring object-based software, or file-based software, to reassemble object fragments and file fragments, respectively.

Figure 5:
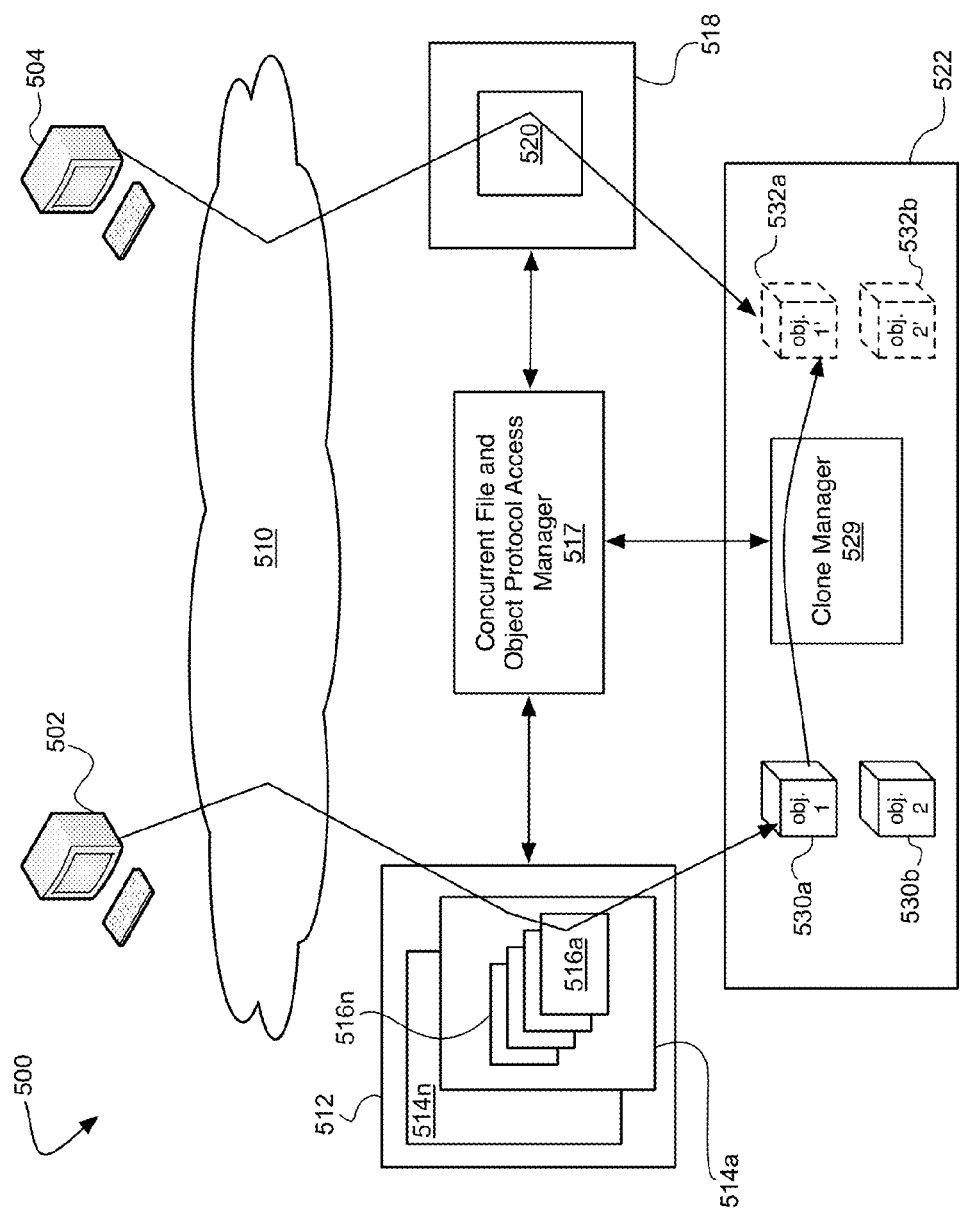
FIG. 5 depicts a system for providing concurrent file and object protocol access using-space efficient cloning, according to one embodiment.

FIG. 5 depicts a system 500 for providing concurrent file and object protocol access using-space efficient cloning, in accordance with one embodiment. As an option, the present system 500 may be implemented in conjunction with features from any other embodiment listed herein, such as those described with reference to the other FIGS. Of course, however, such system 500 and others presented herein may be used in various applications and/or in permutations which may or may not be specifically described in the illustrative embodiments listed herein. Further, the system 500 presented herein may be used in any desired environment.

As shown in FIG. 5, the system 500 includes an object-based client 502, a file-based client 504, a network 510, an object server 512, a concurrent file and object protocol access manager 517, a file stack 518, and a storage pool 522. For purposes of simplicity, the system 500 is shown to include a single object-based client 502 and a single file-based client 504, however it is anticipated that in operation the system 500 may include numerous object-based clients and numerous file-based clients 504.

The data stored in the storage pool 522 may comprise one or more object 530, such as object 530a and object 530b depicted in FIG. 5. In one embodiment, the storage pool 522 may comprise a file system. Additionally, the storage pool 522 is shown to include clones 532, such as clone 532a and clone 532b depicted in FIG. 5.

The network 510 may include any group of two or more devices linked together for communication. The network 510 may include one or more of a LAN, a WAN, and a public network (e.g., the Internet). Additionally, the file stack 518 comprises any entity that exports the clones 532 in the storage pool 522 to the file-based client 504. Exporting the clones 532 may include any operation that enables devices, such as the file-based client 504, that are not directly connected to the storage pool 522 to view and manipulate data that is in the storage pool 522. The file stack 518 may export the storage pool 522 utilizing external services 520. The external services 520 may include network applications and protocols, such as Network File System (NFS), Server Message Block (SMB), iSCSI, etc., each of which may export the storage pool 522 for access by the file-based client 504. Accordingly, the file-based client 504 may access the clones 532 of the storage pool 522 through the file stack 518. Further, the file-based client 504 may access the clones 532 using network protocols such as NFS, SMB, etc.

Still yet, the object-based client 502 may include any device that accesses the objects 530 of the storage pool 522 through the object server 512. The object server 512 may comprise any server that can store objects to, retrieve objects from, and/or delete objects from an object storage device. Accordingly, any request from the object-based client 502 (e.g., a HEAD, GET, PUT, DELETE, etc.) may be received, handled, and/or replied to, by the object server 512.

As shown in FIG. 5, the object server 512 includes a plurality of accounts 514, depicted as account 514a ... 514n. Further, each of the accounts 514 includes one or more containers. As depicted in FIG. 5, the account 514a is shown to include containers 516a ... 516n. Each of the containers may refer to storage locations for the objects stored in the container. In such systems, each of the objects may be physically stored in a file system. Further, in such embodiments, the objects may be physically stored in a manner that is separate from file data stored in a hierarchical manner on the file system. Thus, the objects may be stored with a layout of: <Account><--><Container><--><Object>, where "<-->" indicates a reference between each entity.

The concurrent file and object protocol access manager 517 comprises any entity that monitors access of the storage pool 522 by the object-based client 502 and/or the file-based client 504, and triggers the creation of the clones 532 based on such access. Accordingly, the concurrent file and object protocol access manager 517 may interface with the object server 512 and the file stack 518 to monitor access requests made by the object-based client 502 and the file-based client 504, as well as other activity occurring within the object server 512 and the file stack 518. In this manner, the concurrent file and object protocol access manager 517 may detect the actions of clients, such as GET requests, PUT requests, file open requests, file write requests, etc. Accordingly, the concurrent file and object protocol access manager 517 may detect when the file-based client 504 has completed writing or modifying the clones 532.

The clone manager 529 comprises any entity that, under the instruction of the concurrent file and object protocol access manager 517, creates and removes the clones 532 of the objects 530. In other words, in response to instructions from the concurrent file and object protocol access manager 517, the clone manager 529 instantiates and deletes the clones 532.

As illustrated in FIG. 5, the clone manager 529 has, under the control of the concurrent file and object protocol access manager 517, created the clone 532a based on the object 530a. Further, the object-based client 502 is allowed to access the object 530a (e.g., an HTTP GET request, etc.), simultaneous with the access of the clone 532a by the file-based client 504. In this manner, the object-based client 502 and the file-based client 504 may simultaneously access the same data.

In some embodiments, the concurrent file and object protocol access manager 517 and the clone manager 529 may be embodied in the same hardware and/or software.

As shown in FIG. 5, the object-based client 502 may initiate an object PUT request, which arrives at the object server 512 via the network 510. In response to the object PUT request, the object server 512 writes the received object data to the storage pool 522. Moreover, the object server 512 informs the concurrent file and object protocol access manager 517 of the object PUT.

As one option, in response to the object PUT, the concurrent file and object protocol access manager 517 triggers the clone manager 529 to create the clone 532a of the object 530a. As another option, creation of the clone 532a may be delayed until the file-based client 504 attempts to access the data of the object 530a. In this manner, it is ensured that any file-based client 504 will only work with the data of the clones 532. Moreover, it is also ensured that any file-based client 504 is presented the latest version of the data, as file-based clients 504 may not be aware of the versioning of the underlying object 530. In one embodiment, all clones 532 may be placed in a dedicated storage region within a file system that keeps the clones 532 separate from the objects 530.

Still yet, the concurrent file and object protocol access manager 517 informs the object server 512 of any new files created by the filed based client 504. Because the concurrent file and object protocol access manager 517 is aware of any client access of the objects 530 and the clones 532, the concurrent file and object protocol access manager 517 is aware of any new files created and saved to the storage pool 522 by the file-based client 504. After the file-based client 504 has finished writing a new file to the storage pool 522, the new file may be replicated to an object 530, and the concurrent file and object protocol access manager 517 may inform the object server 512 of the new object.

In one embodiment, whenever an object 530 is updated, the object server 512 may inform the concurrent file and object protocol access manager 517. As an option, in response to the object update, the concurrent file and object protocol access manager 517 may delete any existing clones of the old version(s) of the object, and/or the old version(s) of the object.

In one embodiment, the object server 512 may inform the concurrent file and object protocol access manager 517 whenever the object server 512 has finished writing new object data to the storage pool 522. In response, the concurrent file and object protocol access manager 517 may create a clone of the new object data.

Figure 6A:
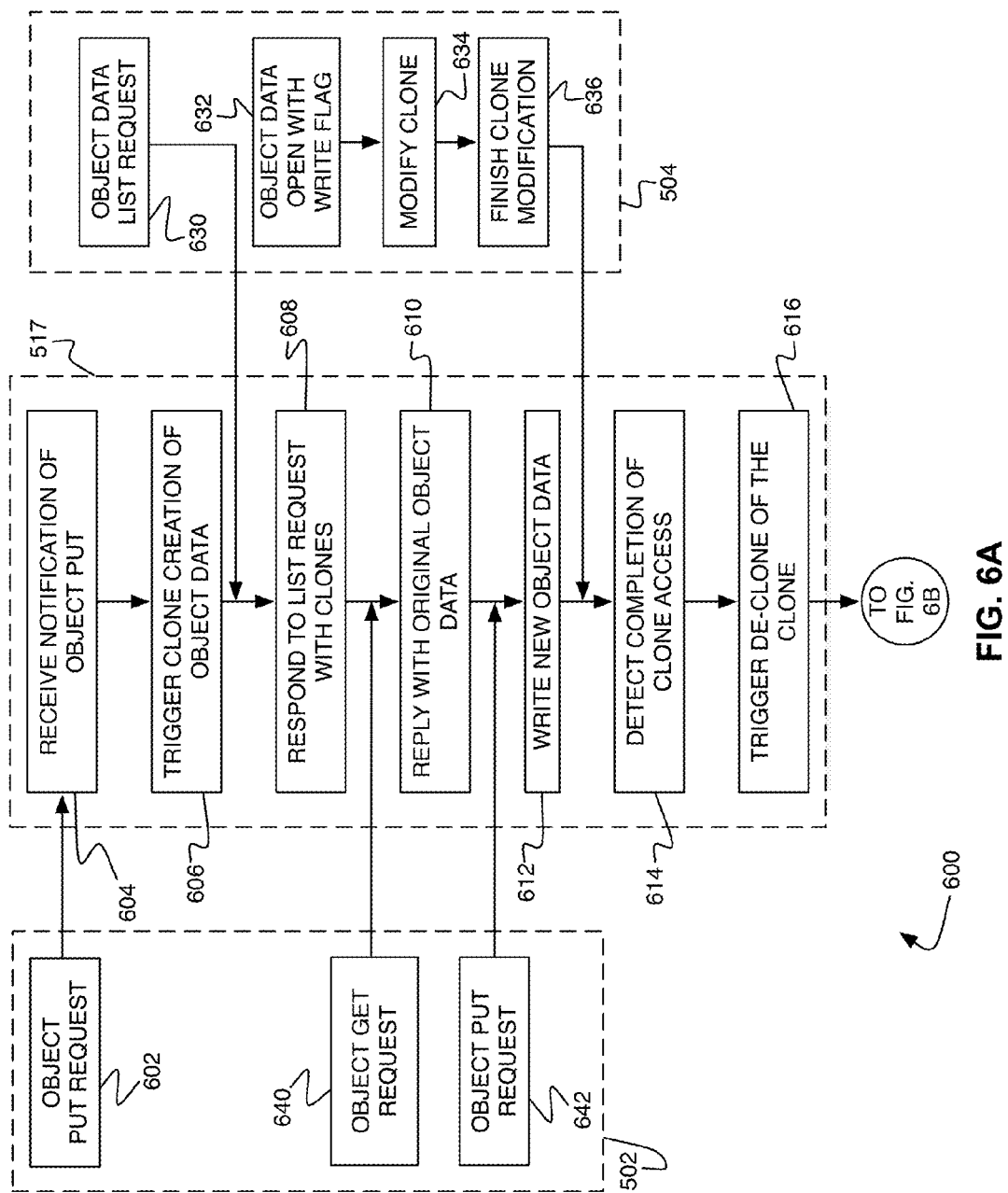
FIGS. 6A-6B depict a communication flow for providing concurrent file and object protocol access using space-efficient cloning, according to one embodiment.
Figure 6B:
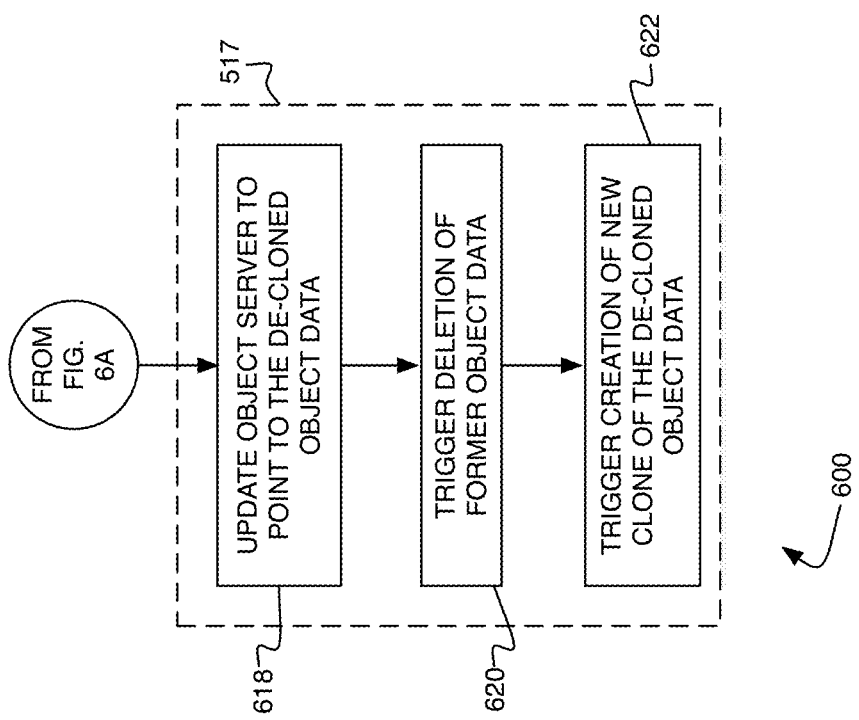

Now referring to FIGS. 6A-6B, a communication flow 600 is shown according to one embodiment. The method 600 may be performed in accordance with the present invention in any of the environments depicted in FIGS. 1-5, among others, in various embodiments. Of course, more or less operations than those specifically described in FIGS. 6A-6B may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6A, the communication flow 600 may initiate with a concurrent file and object protocol access manager 517 receiving notification of an object PUT request at operation 604. As illustrated in FIG. 6A, the PUT request 602 is received from the object-based client 502 described in the context of FIG. 5. As an option, the PUT request may be received at an object server, such as the object server 512 described in the context of FIG. 5. After receiving the notification of the PUT request, the concurrent file and object protocol access manager 517 triggers the creation of a clone of the data of the object at operation 606.

When a file-based client 504 issues a request for an object data list, at operation 630, the concurrent file and object protocol access manager 517 responds to the list request, at operation 608, using clones in the storage pool. Additionally, when the object-based client 502 issues a GET request 640 for an object, the concurrent file and object protocol access manager 517 replies, at operation 610, with the original object data. In other words, even if a clone has been created for the requested object, the response to the GET request 640 provides the object-based client 502 with the object as it was stored, and without any modifications tracked by an associated clone.

When the object-based client 502 issues a new object PUT request 642 to replace the object of the GET request 640, the concurrent file and object protocol access manager 517 writes the new object at operation 612.

For simplicity, FIG. 6A is illustrated such that the PUT request 602, the GET request 640, and the PUT request 642 all originate from the same object-based client 502. However, it is contemplated that the PUT request 602, the GET request 640, and the PUT request 642 may originate from any combination and number of different object-based clients.

Also, the file-based client 504 may open the data of the object utilizing a write flag at operation 632. In response to the open request of the operation 632, the file-based client 504 is provided a clone of the object, and the file-based client 504 then modifies the clone at operation 634. After the file-based client 504 finishes modifying the clone, at operation 636, the concurrent file and object protocol access manager 517 detects, at operation 614, that the file-based client 504 has finished accessing the clone. In response to detecting that the file-based client 504 has finished accessing the clone, the concurrent file and object protocol access manager 517 triggers a de-clone of the clone at operation 616. As an option, triggering the de-clone of the clone may include instructing a clone manager to de-clone the clone, and the clone manager then performing the de-clone.

Performing the de-clone of the clone may include any operation that unlinks the clone from the object for which the clone is used to track changes. Further, performing the de-clone may include merging the changes tracked in the clone with the object that the clone is associated with, such that a new object is generated. The new object may also be herein referred to as de-cloned object data or a de-cloned object. At this point, the de-cloned object data may be retrieved by an object-based client that issues an appropriate GET request.

At operation 618, the concurrent file and object protocol access manager 517 updates the object server to point to the de-cloned object data. Further, at operation 620, the concurrent file and object protocol access manager 517 triggers deletion of the former object data. In other words, the concurrent file and object protocol access manager 517 causes the old version of the object, which has been updated or replaced with the de-cloned object data, to be deleted at operation 620. In one embodiment, the former object data may be deleted by a clone manager. In another embodiment, the former object may be deleted by the concurrent file and object protocol access manager 517.

Still further, at operation 622, the concurrent file and object protocol access manager 517 triggers creation of a new clone of the de-cloned object data. The new clone of the de-cloned object data may be created by a clone manager. The new clone may be utilized by the file-based client 504 for subsequently modifying the data of the de-cloned object.

Figure 7:
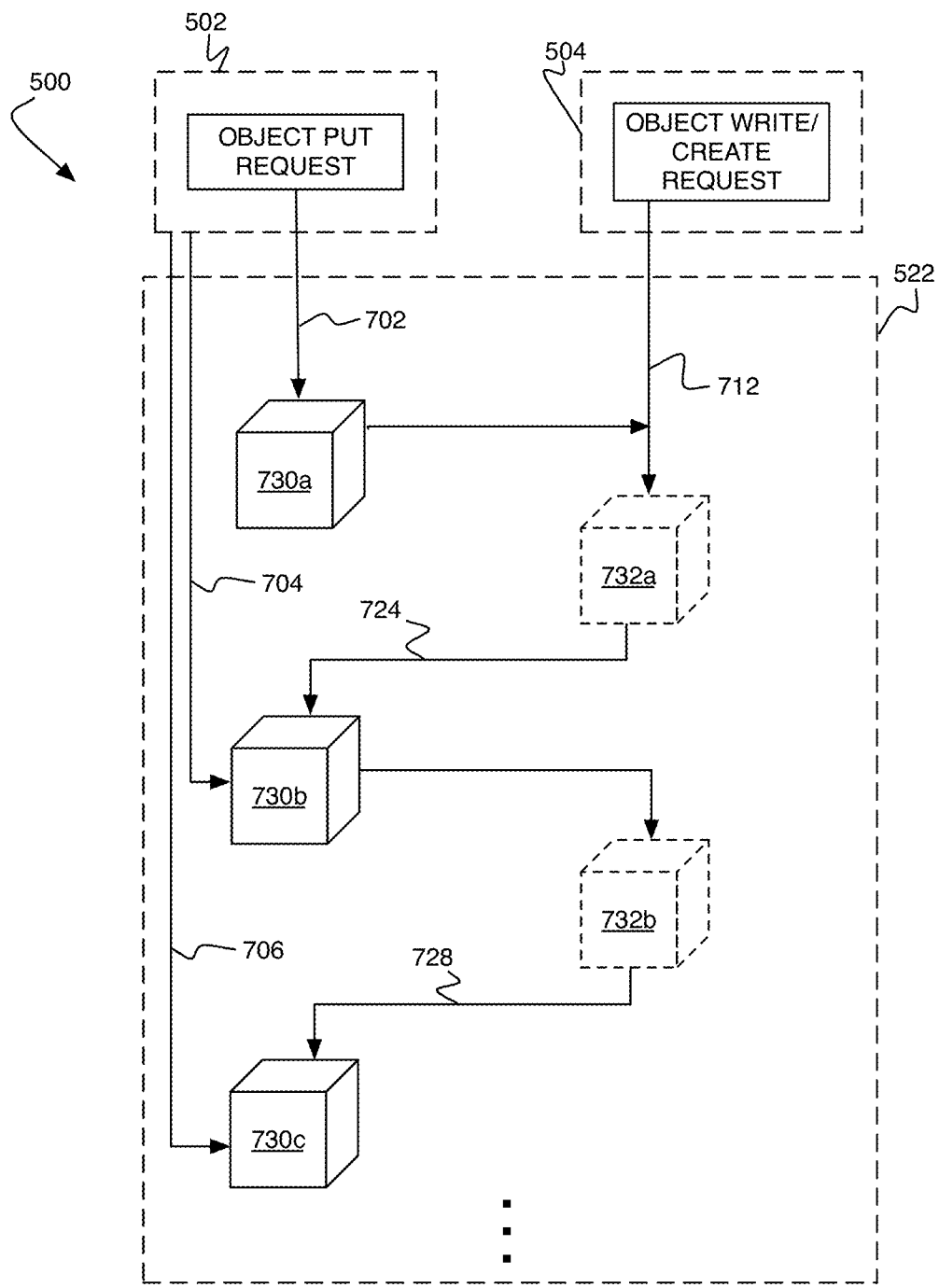
FIG. 7 depicts a system for providing concurrent file and object protocol access using-space efficient cloning, according to one embodiment.

FIG. 7 depicts another view of the system 500 for providing concurrent file and object protocol access using-space efficient cloning, in accordance with one embodiment. As shown in FIG. 7, an object 730a is created in the storage pool 522 based on an object PUT request 702 received from an object-based client 502. Further, a clone 732a is created based on the object 730a. In response to an object write/create request 712 from a file-based client 504, the file-based client 504 is given access to the clone 732a. As an option, the clone 732a may be created in response to the write/create request 712 from the file-based client 504.

After the file-based client 504 has finished modifying the clone 732a, a de-clone operation 724 results in merging changes tracked in the clone 732a with the object 730a that the clone is associated with, such that a new object 730b is generated. The new object 730b may then be retrieved by the object-based client 502 utilizing a GET request 704.

The above operations may repeat iteratively and indefinitely, thereby providing both the object-based client 502 and the file-based client 504 with up-to-date object access. For example, as illustrated in FIG. 7, a clone 732b is created based on the object 730b. Subsequently, a de-clone operation clone 728 results in merging changes (e.g., modifications made by a file-based client, etc.) tracked in the clone 732b with the object 730b that the clone is associated with, such that a new object 730c is generated. After the de-cloning operation has been performed, the new object 730c may then be retrieved by the object-based client 502 utilizing a GET request 706.

Figure 8:
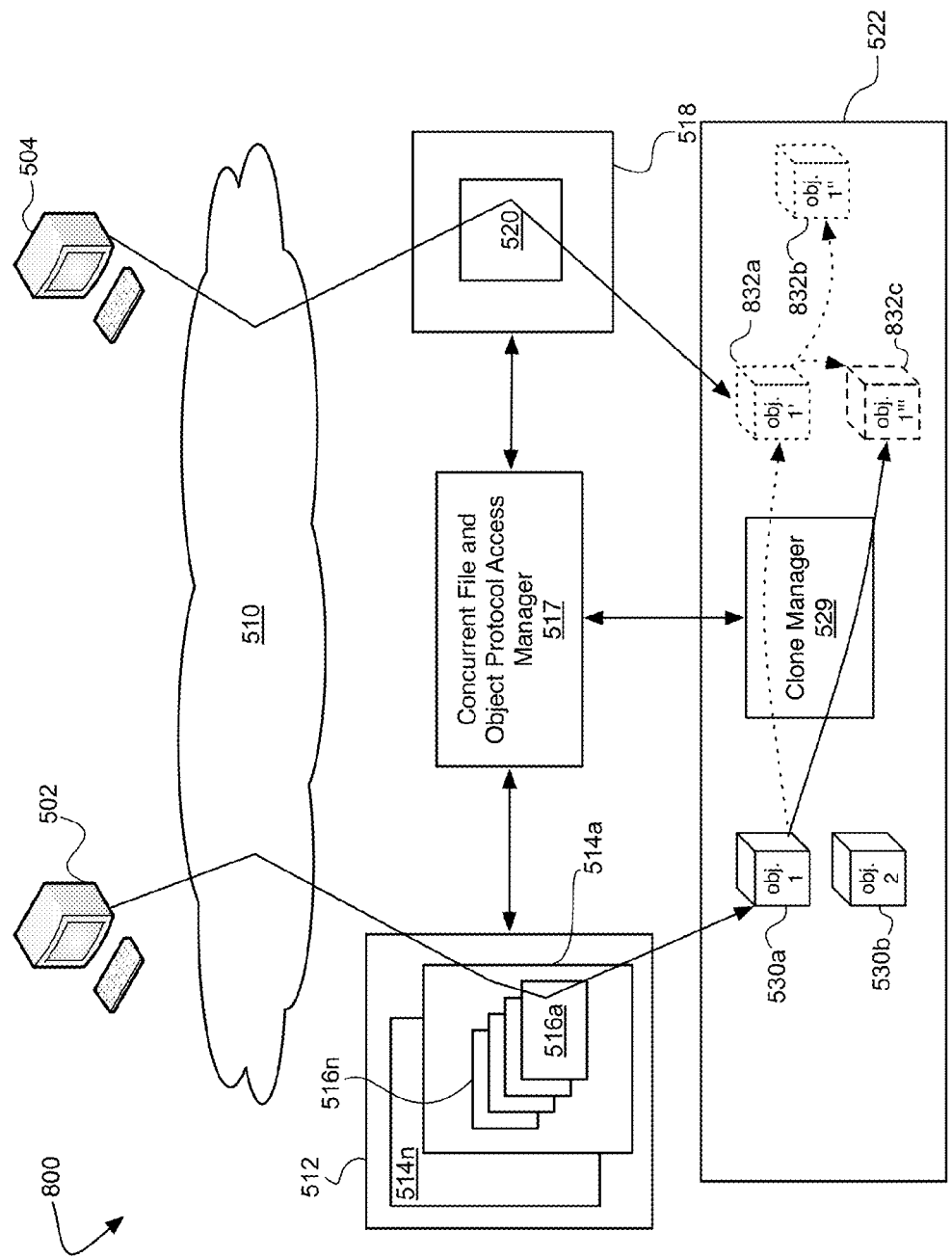
FIG. 8 depicts a system for providing concurrent file and object protocol access using-space efficient cloning, according to one embodiment.

FIG. 8 depicts a system 800 for providing concurrent file and object protocol access using-space efficient cloning, in accordance with one embodiment. As an option, the present system 800 may be implemented in conjunction with features from any other embodiment listed herein, such as those described with reference to the other FIGS. Of course, however, such system 800 and others presented herein may be used in various applications and/or in permutations which may or may not be specifically described in the illustrative embodiments listed herein. Further, the system 800 presented herein may be used in any desired environment.

In operation, the system 800 may generate clones in a manner that avoids the potentially computationally expensive continuous de-cloning operations described in the context of FIGS. 5-7.

As illustrated by FIG. 8, multiple clones 832 have been created based on an object 530a. In particular, clones 832a, 832b, and 832c are all associated with the object 530a. More specifically, unused clones 832a and 832b are old clones of the object 530a that are no longer utilized to track changes made to the object 530a by the file-based client 504, but have not been deleted or otherwise removed from the storage pool 522.

In one embodiment, one or more of the unused clones 832a and 832b may be de-cloned when a predetermined number of unused clones are associated with a given object. For example, if a de-clone operation is triggered when three unused clones are associated with an object, then upon the creation of an additional clone of the object 530a that renders the clone 832c an unused clone, a de-clone operation may be triggered against one or more of the clones 832a, 832b, and 832c. As an option, the de-clone operation may only remove the n oldest clones, where n is less than the number of unused clones stored in association with an object. For example, a de-clone operation triggered when three unused clones are associated with an object may only remove one or two of the oldest unused clones.

In another embodiment, one or more of the unused clones 832a and 832b may be de-cloned when the object-based client 502 issues an object PUT request that replaces the underlying object 530a associated with the unused clones. In yet another embodiment, clone access may be monitored by the concurrent file and object protocol access manager 517, and one or more of the unused clones 832a and 832b may be de-cloned in response to a determination that no file-based client is currently accessing the clones 832a-832c of the object 530a.

Figure 9A:
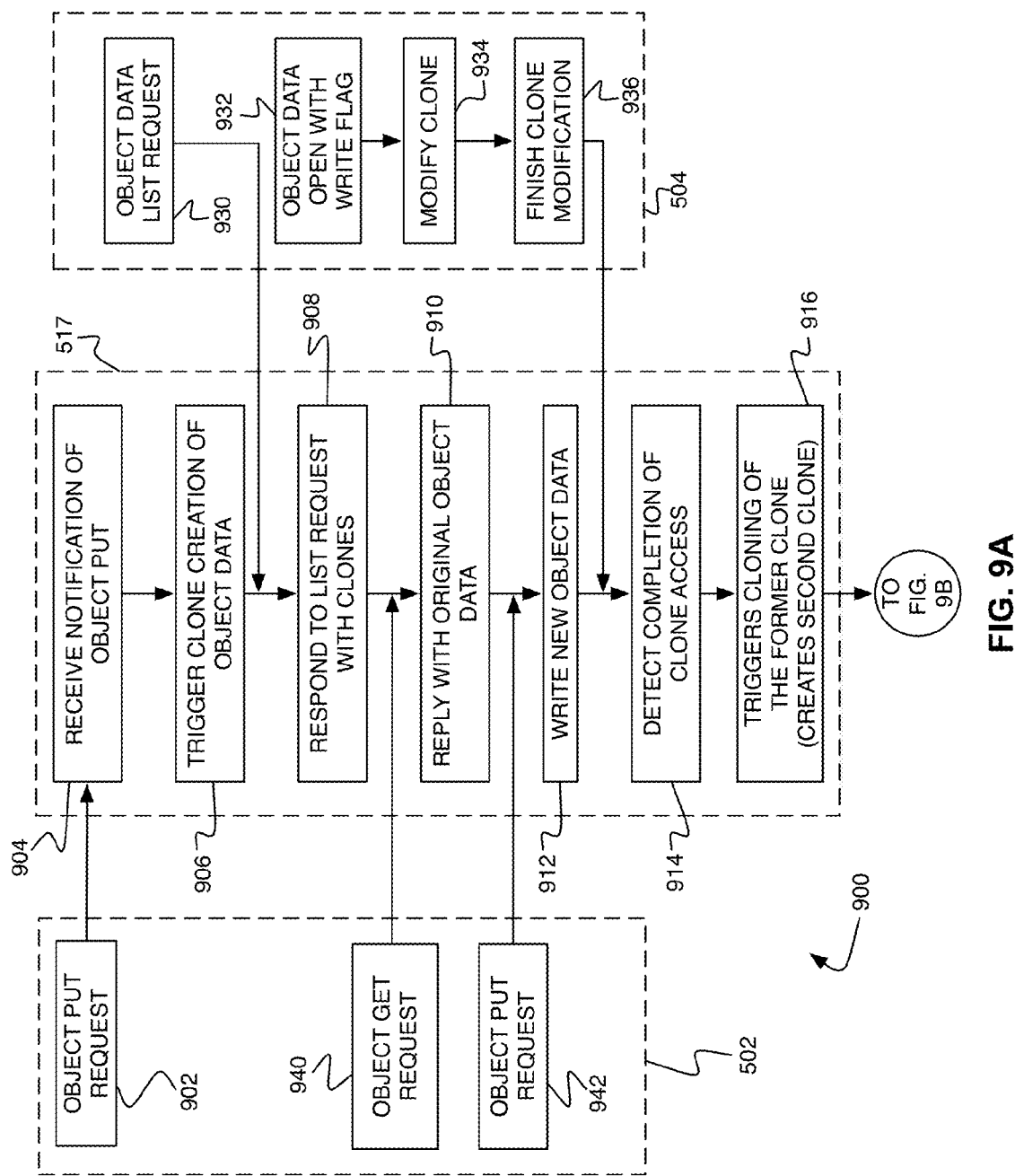
FIGS. 9A-9B depict a communication flow for providing concurrent file and object protocol access using space-efficient cloning, according to one embodiment.
Figure 9B:
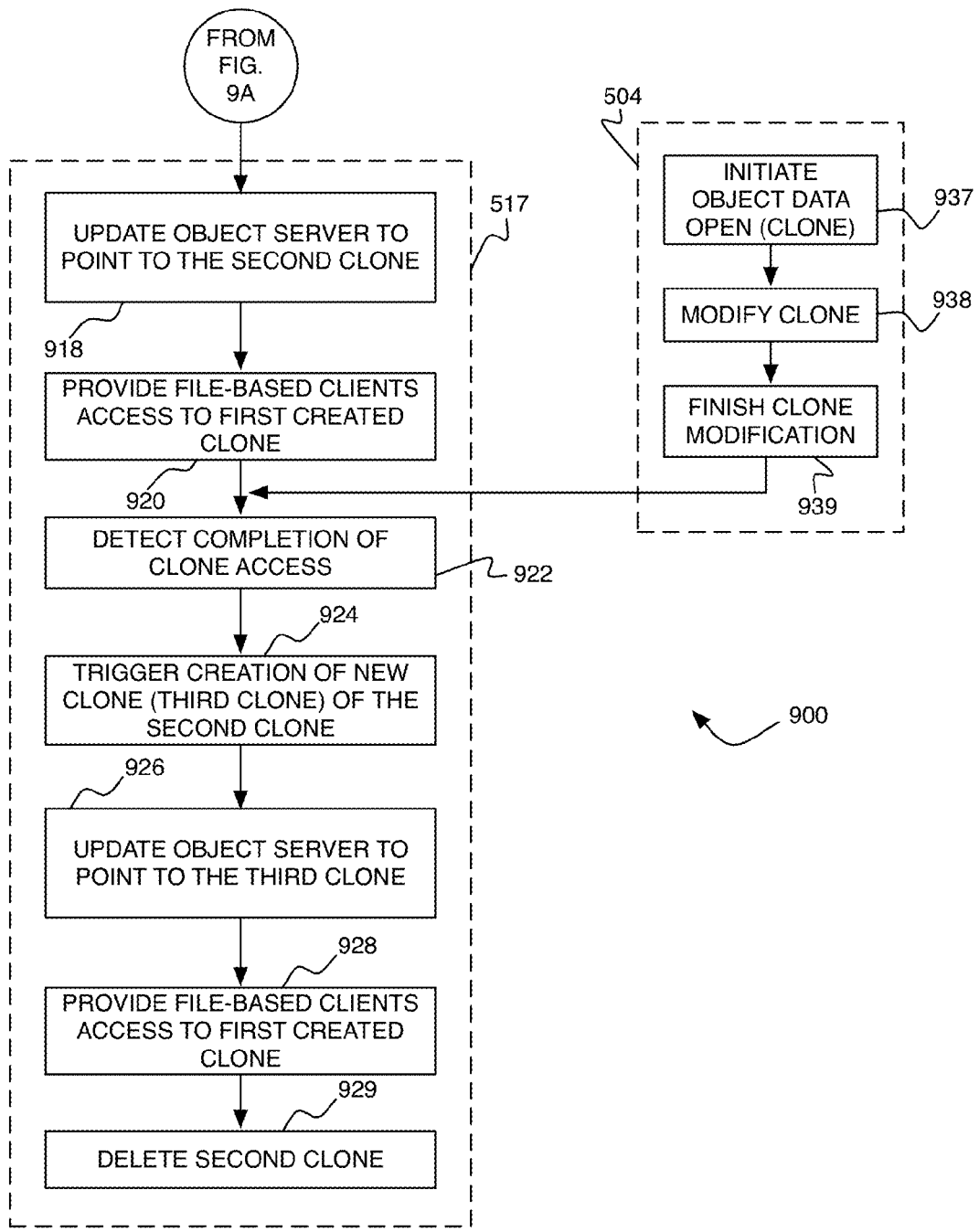

Now referring to FIGS. 9A-9B, a communication flow 900 is shown according to one embodiment. The method 900 may be performed in accordance with the present invention in any of the environments depicted in FIGS. 1-4, and 8, among others, in various embodiments. Of course, more or less operations than those specifically described in FIGS. 9A-9B may be included in method 900, as would be understood by one of skill in the art upon reading the present descriptions.

Each of the steps of the method 900 may be performed by any suitable component of the operating environment. For example, in various embodiments, the method 900 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9A, the communication flow 900 may initiate with a concurrent file and object protocol access manager 517 receiving notification of an object PUT request 902 at operation 904. As illustrated in FIG. 6A, the PUT request 902 is received from the object-based client 502 previously described in the context of FIG. 5. As an option, the PUT request 902 may be received at an object server, such as the object server 512 described in the context of FIG. 5. Subsequent to receiving the notification of the PUT request, the concurrent file and object protocol access manager 517 triggers the creation of a first clone (e.g., clone 832a, etc.) of the data of the object (e.g., object 530a, etc.) at operation 906.

When a file-based client 504 issues a request for an object data list, at operation 930, the concurrent file and object protocol access manager 517 responds to the list request, at operation 908, using clones in the storage pool. Additionally, when the object-based client 502 issues a GET request 940 for the object, the concurrent file and object protocol access manager 517 replies, at operation 910, with the original object data. In other words, even if a clone has been created for the requested object, the response to the GET request 940 provides the object-based client 502 with the object as it was stored, and without any modifications tracked by an associated clone.

Additionally, the object-based client 502 issues a new object PUT request 942 to replace the object of the GET request 940. For simplicity, FIG. 9A is illustrated such that the PUT request 902, the GET request 940, and the PUT request 942 all originate from the same object-based client 502. However, it is contemplated that the PUT request 902, the GET request 940, and the PUT request 942 may originate from any combination and number of different object-based clients.

Still yet, while the object-based client 502 issues the object GET request 940 and/or the object PUT request 942, the file-based client 504 opens the data of the object utilizing a write flag at operation 932. In response to the open request of the operation 932, the file-based client 504 is provided the first clone (e.g., clone 832a, etc.) of the object, and the file-based client 504 begins modifying the first clone at operation 934. The file-based client 504 finishes modifying the first clone at operation 936.

If the object PUT request 942 updating the object is received from the object-based client 502 during the time that the file-based client 504 is writing to the first clone (e.g., clone 832a, etc.) of the object, the data of the object PUT request 942 will be written to a new object data file at operation 912.

However, if, at the time that the object PUT request 942 is completed, no file-based client 504 is writing to the first clone (e.g., clone 832a, etc.), then the data of the original object and the first clone of the original object may be deleted. Moreover, if, at the time that the object PUT request 942 is finished, no file-based client 504 is writing to the first clone, then a second clone (e.g., clone 832b, etc.) is created based on the data of the object received in the PUT request 942. At this point, any file-based client 504 requesting access to the object will be directed to the second clone.

The concurrent file and object protocol access manager 517 detects, at operation 914, that the file-based client 504 has finished accessing the first clone. In response to detecting that the file-based client 504 has finished accessing the first clone, the concurrent file and object protocol access manager 517 triggers, at operation 916, the creation of a second clone (e.g., clone 832b, etc.) by cloning the clone previously created at operation 906. As an option, triggering the creation of the second clone may include instructing a clone manager to clone the first clone, and the clone manager then performs the cloning operation. Additionally, in order to ensure that objects are separated from file data (e.g., clones, etc.), all clones may be created in a dedicated section within the storage pool.

At operation 918, the concurrent file and object protocol access manager 517 updates the object server to point to the second clone (e.g., clone 832b, etc.). At this point, the object associated with the second clone may be updated (i.e., replaced with a new object) to reflect the modifications made by the file-based client 504 at operations 934 and 936. In this way, the object server may view the second clone as including updated object data.

Moreover, at this point, the file-based client 504 is provided access, at operation 920, to the first clone (e.g., clone 832a, etc.). For example, the file-based client 504 may initiate an object data open at operation 937. As an option, the object data open may be initiated, at operation 937, with a write flag. The file-based client 504 is then given access to the first clone, and modifies the first clone at operation 938.

When the file-based client 504 finishes modifying the first clone (e.g., clone 832a, etc.) at operation 939, the concurrent file and object protocol access manager 517 detects, at operation 922, that the file-based client 504 has completed its access of the first clone. In response to detecting the completion of clone access at operation 922, the concurrent file and object protocol access manager 517 triggers, at operation 924, the creation of a new clone (i.e., a third clone 832c, etc.) of the first clone.

At operation 926, the concurrent file and object protocol access manager 517 updates the object server to point to the third clone (e.g., clone 832c, etc.). At this point, the object associated with the third clone may be updated (i.e., replaced with a new object) to reflect the modifications made by the file-based client 504 at operations 938 and 939. In this way, the object server may view the third clone as including updated object data. Moreover, at this point, the file-based client 504 is again provided access, at operation 928, to the first clone (e.g., clone 832a, etc.). In this manner, multiple unused clones may be created within the storage pool.

Still further, at operation 929, the concurrent file and object protocol access manager 517 deletes the second clone (e.g., clone 832b, etc.). As an option, the second clone may be deleted during a de-cloning operation that is triggered by a threshold number of clones being stored. As another option, the de-cloning operation may be triggered based on file attributes. For example, the de-cloning operation may be triggered based on a number of blocks changed, and/or a size of the changes, in comparison to the parent object. As yet another option, the second clone may be deleted when no file-based client is accessing the second clone. Additionally, the concurrent file and object protocol access manager 517 may instruct the object server to delete one or more old versions of the object.

Figure 10:
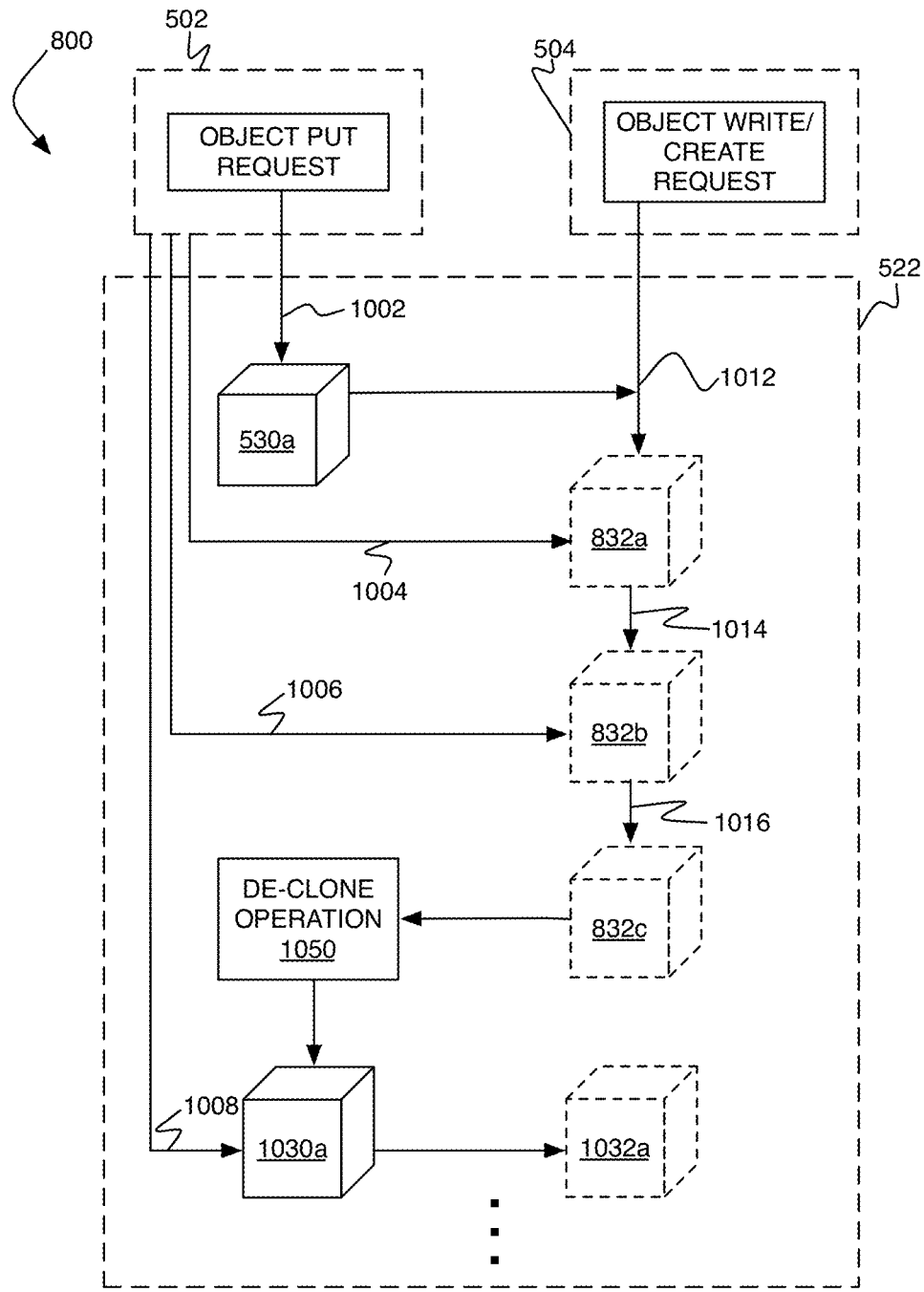
FIG. 10 depicts a system for providing concurrent file and object protocol access using-space efficient cloning, according to one embodiment.

FIG. 10 depicts another view of the system 800 for providing concurrent file and object protocol access using-space efficient cloning, in accordance with one embodiment. As shown in FIG. 10, an object 530a is created in the storage pool 522 based on an object PUT request 1002 received from the object-based client 502. Further, a first clone 832a is created based on the object 530a. In response to an object write/create request 1012 from a file-based client 504, the file-based client 504 is given access to the first clone 832a. As an option, the first clone 832a may be created in response to the object write/create request 1012 from the file-based client 504.

When the file-based client 504 has completed modifying the clone 832a, a second clone 832b is created at operation 1014. Further, at this point, an object GET request 1004 received from the object-based client 502 for the object 530a will now return the changes to the object 530a made by the file-based client 504 and tracked in the first clone 832a. In other words, the object-based client 502 requesting object data will receive the object data based on the contents of the second newest clone for the object.

Moreover, the file-based client 504 may receive access to, and modify, the second clone 832b. When the file-based client 504 has completed modifying the second clone 832b, a third clone 832c is created at operation 1016. At this point, an object GET request 1006 received from the object-based client 502 for the object 530a will now return the changes to the object 530a made by the file-based client 504 and tracked in the second clone 832b.

Moreover, as illustrated by FIG. 10, a de-clone operation 1050 is performed on the third clone 832c. As a result of the de-clone operation 1050, an object 1030a is generated and stored to the storage pool 522. The object 1030a comprises the object 530a updated with any modifications tracked in the clone 832c. As noted above, the de-clone operation 1050 may be triggered based on the number of stored clones 832 associated with the object 530a, a lack of access by file-based clients, etc. At this point, an object GET request 1008 received from the object-based client 502 for the object 530a may now return the object 1030a. Additionally, a clone 1032a may be created based on the object 1030a, and the clone 1032a may thereafter be used for tracking modifications made to the object 1030a by the file-based client 504.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for providing concurrent file and object protocol access, the computer program product comprising a computer readable storage medium having computer readable program code embodied therewith, the computer readable program code comprising:
   computer readable program code configured to receive a notification that indicates storage of an object in response to an object PUT request from an object-based client, utilizing an object-based access protocol;
   computer readable program code configured to create a clone of the object;
   computer readable program code configured to identify a request to access the object by a file-based client different from the object-based client;
   computer readable program code configured to provide, to the file-based client, access to the clone of the object, utilizing a file-based network attached storage (NAS) protocol different from the object-based access protocol, where the file-based NAS protocol implements a traversal of a file system hierarchy;
   computer readable program code configured to identify a modification of the clone of the object by the file-based client that results in a modified clone of the object;
   computer readable program code configured to return the object to the object-based client or another object-based client, in response to one or more object GET read requests for the object received from the object-based client or the other object-based client during the modification of the clone of the object by the file-based client; and
   computer readable program code configured to replace the object with an updated object after the modification of the clone of the object, utilizing the modified clone of the object.

2. The computer program product of claim 1, wherein the modification of the clone of the object is performed utilizing the file-based NAS protocol.

3. The computer program product of claim 1, comprising computer readable program code configured to:
create a second clone of the updated object; and
delete the object and remove the clone of the object, in response to the creation of the second clone of the updated object.

4. The computer program product of claim 1, wherein the clone of the object includes a representation of blocks of the object that have changed relative to when the object was stored in response to the request from the object-based client.

5. The computer program product of claim 4, wherein replacing the object with the updated object includes merging the object with the blocks of the object that have changed relative to when the object was stored in response to the request from the object-based client, to create the updated object.

6. The computer program product of claim 1, comprising:
computer readable program code configured to provide, to the file-based client, access to the modified clone of the object; and
computer readable program code configured to, after the file-based client has finished modifying the modified clone of the object:
based on the modification of the modified clone by the file-based client, generate an additional clone of the object, and
replace the updated object with an additional object based on the additional clone of the object;
wherein each of the clone, the modified clone, and the additional clone are separately and simultaneously stored.

7. The computer program product of claim 6, comprising computer readable program code configured to return, in response to one or more read requests for the object received from one or more object-based clients while the file-based client modifies the modified clone of the object to generate the additional clone, the updated object to the one or more object-based clients.

8. The computer program product of claim 6, comprising computer readable program code configured to de-clone the clone, the modified clone, and the additional clone in response to determining that a predetermined number of clones are associated with the object.

9. The computer program product of claim 1, wherein the clone of the object is created in response to the storage of the object in response to the request from the object-based client.

10. The computer program product of claim 1, wherein the clone of the object is created in response to identifying the request to access the object by the file-based client.

11. A computer-implemented method for providing concurrent file and object protocol access, the method comprising:
receiving a notification that indicates storage of an object in response to an object PUT request from an object-based client, utilizing an object-based access protocol;
creating a clone of the object;
identifying a request to access the object by a file-based client different from the object-based client;
providing, to the file-based client, access to the clone of the object utilizing a file-based network attached storage (NAS) protocol different from the object-based access protocol, where the file-based NAS protocol implements a traversal of a file system hierarchy;
identifying a modification of the clone of the object by the file-based client that results in a modified clone of the object;
replacing the object with an updated object based on the modified clone of the object;
providing, to the file-based client, access to the modified clone of the object;
identifying a modification of the modified clone of the object by the file-based client; and
replacing the updated object with an additional object based on the modification of the modified clone of the object.

12. The computer-implemented method of claim 11, wherein the modification of the clone of the object is performed utilizing the file-based NAS protocol.

13. The computer-implemented method of claim 11, further comprising:
creating a second clone of the updated object; and
deleting the object and removing the clone of the object, in response to the creation of the second clone of the updated object.

14. The computer-implemented method of claim 11, wherein the clone of the object includes a representation of blocks of the object that have changed relative to when the object was stored in response to the request from the object-based client.

15. The computer-implemented method of claim 14, wherein replacing the object with the updated object includes merging the object with the blocks of the object that have changed relative to when the object was stored in response to the request from the object-based client, to create the updated object.

16. The computer-implemented method of claim 11, comprising:
based on the modification of the modified clone of the object by the file-based client, generating an additional clone of the object, wherein the additional object is based on the additional clone of the object;
wherein each of the clone of the object, the modified clone of the object, and the additional clone of the object are separately and simultaneously stored.

17. The computer-implemented method of claim 16, comprising returning, in response to one or more read requests for the object received from one or more object-based clients while the file-based client modifies the modified clone of the object to generate the additional clone, the updated object to the one or more object-based clients.

18. The computer-implemented method of claim 16, comprising de-cloning the clone, the modified clone, and the additional clone in response to determining that a predetermined number of clones are associated with the object.

19. The computer-implemented method of claim 11, wherein the clone of the object is created in response to the storage of the object in response to the request from the object-based client.

20. A computer program product for providing concurrent file and object protocol access, the computer program product comprising a computer readable storage medium having computer readable program code embodied therewith, the computer readable program code comprising:
computer readable program code configured to receive a notification that indicates storage of an object in response to an object PUT request from an object-based client, utilizing an object-based access protocol;

computer readable program code configured to create a clone of the object;
computer readable program code configured to identify a request to access the object by a file-based client different from the object-based client;
computer readable program code configured to provide, to the file-based client, access to the clone of the object, utilizing a file-based network attached storage (NAS) protocol different from the object-based access protocol, where the file-based NAS protocol implements a traversal of a file system hierarchy;
computer readable program code configured to identify a modification of the clone of the object by the file-based client that results in a modified clone of the object;
computer readable program code configured to replace the object with an updated object based on the modified clone of the object;
computer readable program code configured to provide, to the file-based client, access to the modified clone of the object;
computer readable program code configured to identify a modification of the modified clone of the object by the file-based client; and
computer readable program code configured to replace the updated object with an additional object based on the modification of the modified clone of the object.

* * * * *